(12) United States Patent
Pak et al.

(10) Patent No.: US 11,310,319 B1
(45) Date of Patent: Apr. 19, 2022

(54) COMPUTING ARCHITECTURE FOR HIERARCHICAL CONTROL OF NETWORK ADDRESSABLE DEVICES

(71) Applicant: PoEWit Technologies, Inc., Fort Lauderdale, FL (US)

(72) Inventors: Victor Seung Bae Pak, San Mateo, CA (US); Dusan Jankov, Fort Lauderdale, FL (US); Steven Keith Latham, Bel Air, MD (US); Dubravka Manitasevic, Fort Lauderdale, FL (US)

(73) Assignee: POEWIT TECHNOLOGIES, INC., Fort Lauderdale, FL (US)

( * ) Notice: Subject to any disclaimer, the term of this patent is extended or adjusted under 35 U.S.C. 154(b) by 0 days.

(21) Appl. No.: 17/066,677

(22) Filed: Oct. 9, 2020

(51) Int. Cl.
  *G06F 15/16* (2006.01)
  *H04L 67/125* (2022.01)
  *G05B 19/042* (2006.01)
  *H04L 12/28* (2006.01)

(52) U.S. Cl.
  CPC .......... *H04L 67/125* (2013.01); *G05B 19/042* (2013.01); *G05B 2219/25011* (2013.01); *H04L 12/2814* (2013.01)

(58) Field of Classification Search
  CPC . H04L 67/125; H04L 12/2814; G05B 19/042; G05B 2219/25011
  See application file for complete search history.

(56) References Cited

U.S. PATENT DOCUMENTS

| | | | |
|---|---|---|---|
| 2017/0005820 A1* | 1/2017 | Zimmerman | H04L 12/2807 |
| 2017/0212487 A1* | 7/2017 | Gupta | F24F 11/62 |
| 2019/0391546 A1* | 12/2019 | Jundt | G05B 19/0426 |
| 2020/0288558 A1* | 9/2020 | Anderson | G06K 7/1413 |

FOREIGN PATENT DOCUMENTS

| | | | | |
|---|---|---|---|---|
| CN | 108200114 B | * | 11/2017 | H04L 29/08 |
| CN | 110325929 A | * | 10/2019 | G06N 3/08 |

\* cited by examiner

*Primary Examiner* — Richard G Keehn
(74) *Attorney, Agent, or Firm* — Rimon PC; Marc Kaufman

(57) ABSTRACT

A control system for controlling a networked system of multiple individually addressable devices, such as lighting devices, each having a logical address based on a network addressing scheme, each lighting device being connected to a computer network through a cable that transmits electric power for powering one or more lighting elements of the lighting device and hierarchical control data for addressing and controlling the lighting device. Each lighting device includes a controller for receiving the hierarchical control data and controlling a state of the one or more lighting elements in accordance with the control data.

16 Claims, 3 Drawing Sheets

COMPUTING ARCHITECTURE FOR HIERARCHICAL CONTROL OF NETWORK ADDRESSABLE DEVICES

BACKGROUND

Traditionally, networked computing devices transmit, process, and receive data over a network and require a source of power that is external to the network. For example, a network router may be plugged into a wall outlet to be powered by 120 v power supplied by a conventional power grid. Recent advances in power efficiency has made it possible to provide various network devices that are addressable and powered over a computer network without the need for power sources external to the network. For example, "Power over Ethernet" (PoE) refers to an architecture that passes electric power along with data on a "twisted pair" Ethernet cable. This allows a single cable to provide both a data connection and electric power to various networking and utility devices, such as Wireless Access Points (WAPs), cameras, sensors and lighting devices. For example, a lighting device can include a processor that receives control commands over the network cable and a power circuit for energizing a lighting element with electrical power transmitted over the network cable. There are several common techniques for transmitting power over Ethernet cabling and related control devices. Three of them have been standardized by Institute of Electrical and Electronics Engineers (IEEE) standard IEEE 802.3 since 2003.

Applications referred to as "smart building", "smart home", "home control", "lighting control" and the like (collectively referred to as "smart control" herein) in which various devices can be controlled over a computing network in an automated manner are well known. For example, Samsung Smarthings™ includes a network hub that permits lighting, HVAC, and other home appliances to be controlled over a wireless network in an automated manner. Honeywell Forge™ provides similar control for commercial buildings. However, these control platforms utilize conventionally powered devices.

There are also more lighting specific platforms such as Benchmarked Kasa™, Leviton™, and Lutron™. These systems also utilize conventional power and further operate in a manner that is analogous to a conventional mechanical light switch. In other words, these systems use high voltage switches and once power is cut to the switches commands cannot be processed by the switch. The switch "remembers" its own last. When power returns, each switch returns to its own last. For example, if a switch was off when power went out, it will be off when power returns. If a switch was subject to a control schedule during the power outage, the switch will go back to the local state when power is restored. In other words, everything that happened in the schedule during the power outage is lost.

PoE and similar technologies have been recognized to have potential in smart control applications. However, implementation of electronic systems that include electric power and data over a single cable have several unique issues that must be resolved before such technologies can be implemented in a predictable and reliable manner in smart control applications. For example, triggering devices, such as switches and sensors, and triggered devices, such as lights, and alarm sirens, must be configurable to be addressed in a manner that allows them to function without conflicts, even in systems where there is a very high number of devices. Further, the advantage of providing power over a network data cable can result in limitations in the case of a power outage or network failure which must be addressed. For example, illumination should be provided to IP security cameras so they record in color and nighttime pathway lights should change into emergency lighting when utility power is not present.

SUMMARY

Disclosed implementations provide a hierarchical control architecture that resolves command conflicts in an efficient and predictable manner to allow the potential of network addressed and powered devices to be fully leveraged.

A first disclosed implementation is a computer architecture of a control system for controlling a networked system of multiple individually addressable devices, the system comprising; a plurality of individually addressable devices each having a logical address based on a network addressing scheme, each addressable device being connected to a computer network through a cable that transmits electric power for powering one or more elements of the addressable device and control commands for addressing and controlling the addressable device, each addressable device including a controller for receiving the control commands and controlling a state of the one or more elements in accordance with the control commands; at least one Permanent Master control device (PM) configured to selectively send control commands to the addressable devices based on the network addressing scheme, whereby one or more of the addressable devices will assume a state specified by the command until another command is generated to change the state; at least one Temporary Master control device (TM) configured to selectively send control commands to the addressable devices based on the network addressing scheme, whereby one or more of the addressable devices will assume a state specified by the command until occurrence of a condition associated with a control signal originated by the TM; a grouping database storing group data including addresses of the addressable devices in correspondence with at least one group; a command database storing control records of the control commands including an address of the TM or PM transmitting the control command and a time stamp for corresponding to each command; a control hierarchy database storing hierarchical control command processing rules; and a status controller for processing the control commands causing the addressable devices to assume predefined states based on the control command processing rules, the group data and the control records. The addressable devices can be any type of controllable device, such as a lighting device, a window shade controller, an irrigation controller, an HVAC device, and the like. The controlled elements of the addressable devices can include switches, solenoids, heating elements, and the like.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form

DETAILED DESCRIPTION

Figure 1:
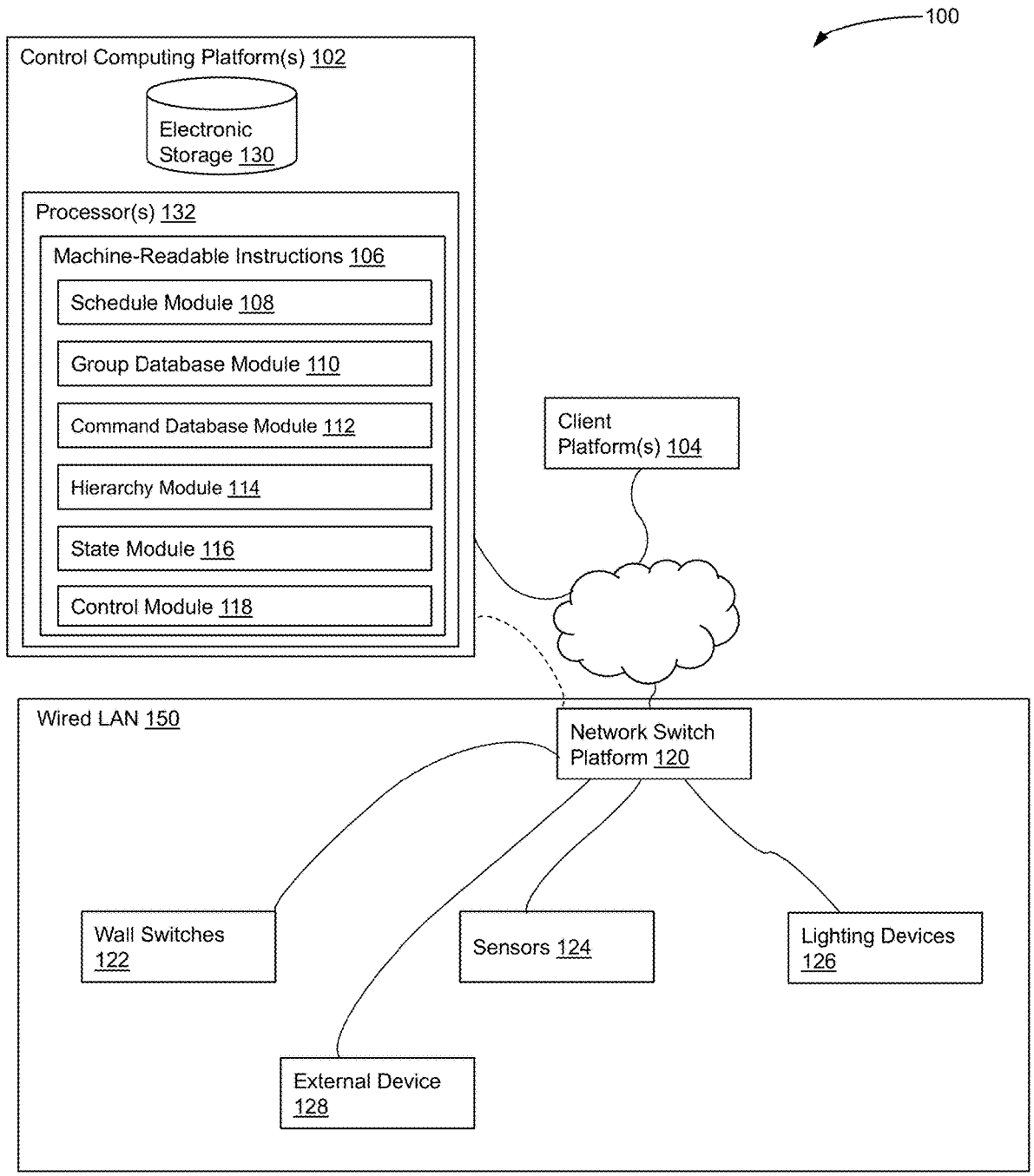
FIG. 1 is a block diagram of a computer architecture in accordance with a disclosed implementation.

FIG. 1 illustrates an architecture in accordance with a disclosed implementation. Architecture 100 includes control computing platforms(s) 102 which can execute device control logic as described in detail below. Control computing platform(s) 102 may be configured by machine-readable instructions 106. Machine-readable instructions 106 are stored in electronic storage 130 and may include one or more groups of instructions that, when executed by processor(s) 132 define functional instruction modules. The instruction modules may include one or more of schedule module 108, group database module 110, command database module 112, hierarchy module 114, state module 116, and control module 118.

Schedule module 108 includes instructions and data to define a device control schedule, for example pre-set times at which devices, such as lighting devices, should change state (from ON to OFF for example). Group database module 100 includes a data structure that defines groups of devices, such as lighting elements. For example, the data structure of group database module could indicate that plural lighting elements are to be controlled in unison, such as when the plural lighting elements are in the same room or area, or the plural lighting elements have the same purpose (e.g., outdoor lighting, path lighting, emergency lighting). Note that the groupings can be state-specific. For example, all path lights might be controlled as a group, when emergency power is being used but those same path lights may be separately controlled by motion sensors when utility power is functioning.

Command database module 112 includes a data structure that stores commands, associated command types and a time stamp. Two types of commands, Permanent Master and Temporary Master, are described below. Hierarchy module 114 stores a data structure specifying a set of rules of priority of different commands based on the device states. State module 116 stores a data structure indicating at least the latest state of each device. Control module 118 works in connection with the other modules to provide command signals for controlling lighting devices in accordance with the schedule, device groupings, command records, hierarchy, and device states. The purpose and function of each module will become apparent based on the description below.

Client computing platform(s) 104 can be communicatively coupled to control computing platform 130 through wired and/or wireless networking protocols. As an example, client computing platform 104 can be a user mobile phone executing a control app or another general purpose computing device. Network switch platform 120, including a computing device and at least one network port switch, such as an ethernet switch, can be connected to the network, through wired or wireless protocols. Network switch platform 120 can include a processor executing instructions stored in memory to provide local control in the case of the loss of cloud connectivity, as described below. In the case of control computing platform being coupled to the wired LAN 150 (described below) only through the cloud, network switch platform can be capable of duplicating the operation of control computing platform, at least to the extent necessary for the system to operate in the manner described herein.

Control devices are coupled to network switch platform 120 through a wired data/power Local Area Network (LAN), a PoE network in this implementation. The control device can include one or more wall switches (WS) 122, sensors 124 (such as current, motion or light sensors), and addressable devices which are to be controlled, such as lighting devices in this example. Addressable devices will be referred to and "lighting devices 126" in this example. However, one of skill in the art will understand how to implement various devices as the controllable addressable devices based on the disclosure herein. Sensors can be for example, motion sensors, light sensors, or the like.

Wall switches 122, sensors 124 and lighting devices 126 all communicate with each other and network switch platform 120 through LAN 150 in which data and power are supplied to the devices by a network cable. Control computing platform can communicate with network switch platform 120 through the internet or any other wired or wireless wide area network (WAN), referred to as the "cloud" herein. However, as indicated by the dotted line, control computing platform 102 can include at least one device that is coupled to network switch over a local area network that can function in the event of a failure of the WAN.

Each of wall switches 122, sensors 124, and lighting devices 126 can be individually addressable by other devices over the LAN. Therefore, unlike conventional systems, competing elements can be triggering, i.e. causing control commands to be sent to, lighting devices 126 and thus the timing and context of each control signal must be tracked and managed to provide efficient and predictable operation of lighting devices 126. Architecture 100 provides a framework and protocol to control these competing commands through user configuration. Implementations accomplish this through a hierarchical set of rules for processing the competing triggering elements and resulting control commands.

The disclosed implementations include a protocol that defines two types of commands: a permanent master (PM) and a temporary master (TM). PMs are effective to set the state of lighting devices 126 (or a group of lighting devices) until a subsequent control command is addressed and sent to the same lighting device 126 (or group of lighting devices). TMs are effective to set the state of lighting devices 126 (or a group of lighting devices) until one or more conditions specified by the TM, such as the lapse of a predetermined time period, has occurred. After the condition has occurred, i.e. the TM has expired, the controlled device (or group of devices) goes back to the state of the last PM control command addressed to that device (or group of devices).

One example of a set of hierarchical rules stored in hierarchy module 114 that are applied to control of lighting devices 126 is set for the below;

One example of operation includes the integration of an Uninterruptable Power Supply (UPS), as external device 128, into architecture 100. In this example, the UPS is used in a known manner to monitor utility power to the architecture 100 and to provide backup power to architecture 100 when utility power is not available. A conventional UPS has the capability of providing a signal indicating whether it is on utility power or backup battery power. Architecture 100 provides the user the ability to leverage this signal to provide more flexible operation of network powered devices. For example, control module 118 can generate control commands that trigger lighting devices 126 to automatically change the state of specified lighting devices 126 based on whether architecture 100 is on utility power or battery power. The state can be ON, OFF, or ON DIMMED to save power. Interaction between the state of the UPS and wall switches 122, sensors 124, and lighting devices 126 can be user-defined through a user interface of client platform 104 and control module 118. Further, Network switch platform 120 can adjust power settings on the PoE Switch to further conserve power required by architecture 100 when on battery power. When utility power is restored, architecture 100 can revert to a given state based on groupings stored in group database module 110, time stamped control signals stored in control signal database module 112, and device status stored in state module 116.

Figure 2:
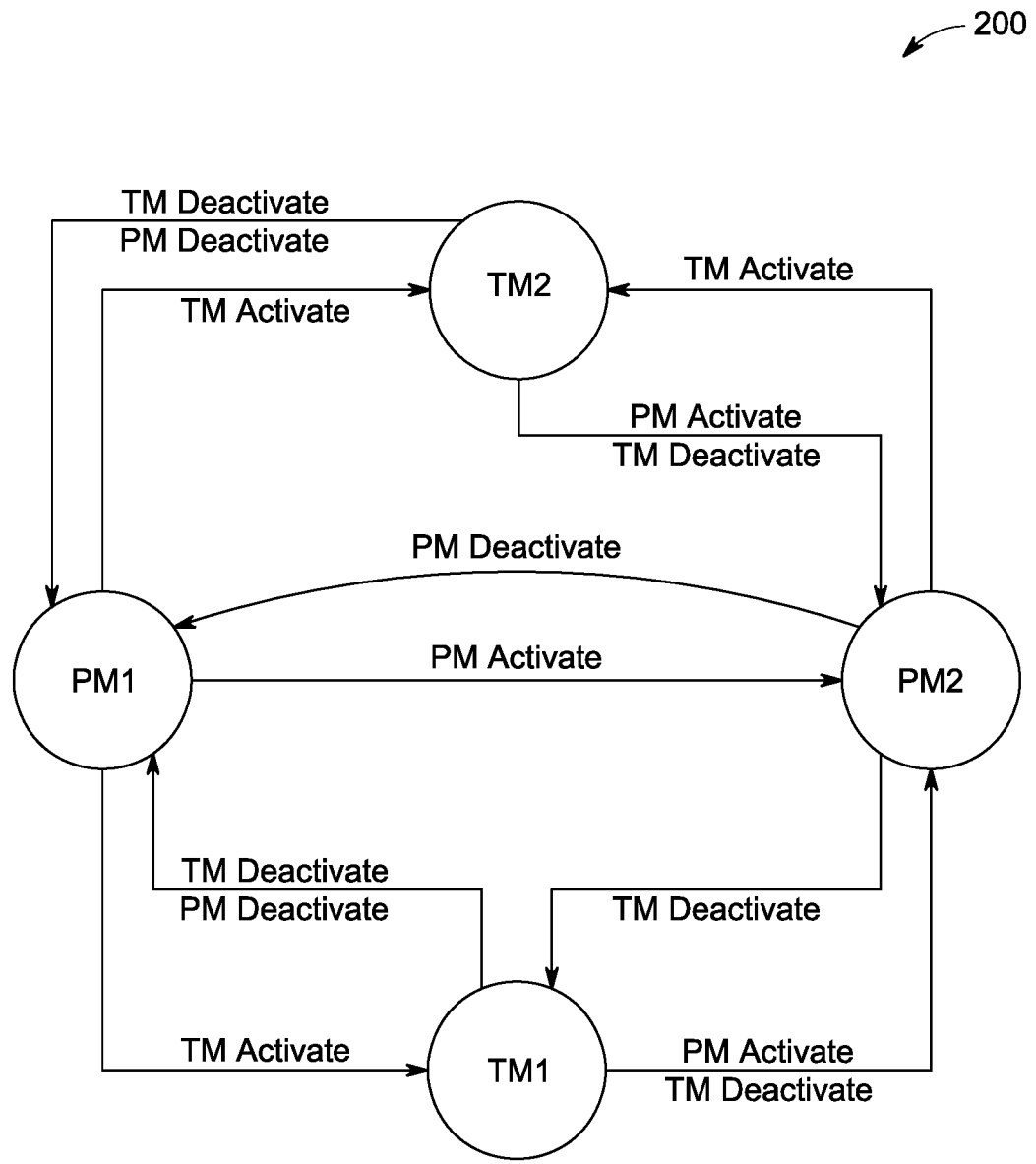
FIG. 2 is graphical state diagram in accordance with a disclosed implementation.

The control hierarchy stored in control hierarchy module 114 can be expressed as a state machine. FIG. 2 graphically illustrates a simple example of a state machine 200 for controlling a single lighting device or a group of lighting devices that are controlled in unison. In FIG. 2, the architecture, such as architecture 100 of FIG. 1, includes wall switches (WS), sensors (such as passive infrared motion sensors and ambient light sensors), a UPS system, lighting elements, a control computing platform (such as control computing platform 102 of FIG. 1, and a network switch platform (such as network switch platform 120 of FIG. 1). In this example, wall switches correspond to a command type PM and the UPS system corresponds to a command type TM. Motion detectors of this implementation can be dual mode sensors; including a passive infrared motion detection element that is of a command type TM, and an ambient light detection element that is of a command type PM.

In the example of FIG. 2, PM, a PM (Any user input) >> state holds until new command from a TM or a PM is received. A TM, such as a sensor input sets a state until the condition occurs and then the state reverts back to last PM.

Figure 3:
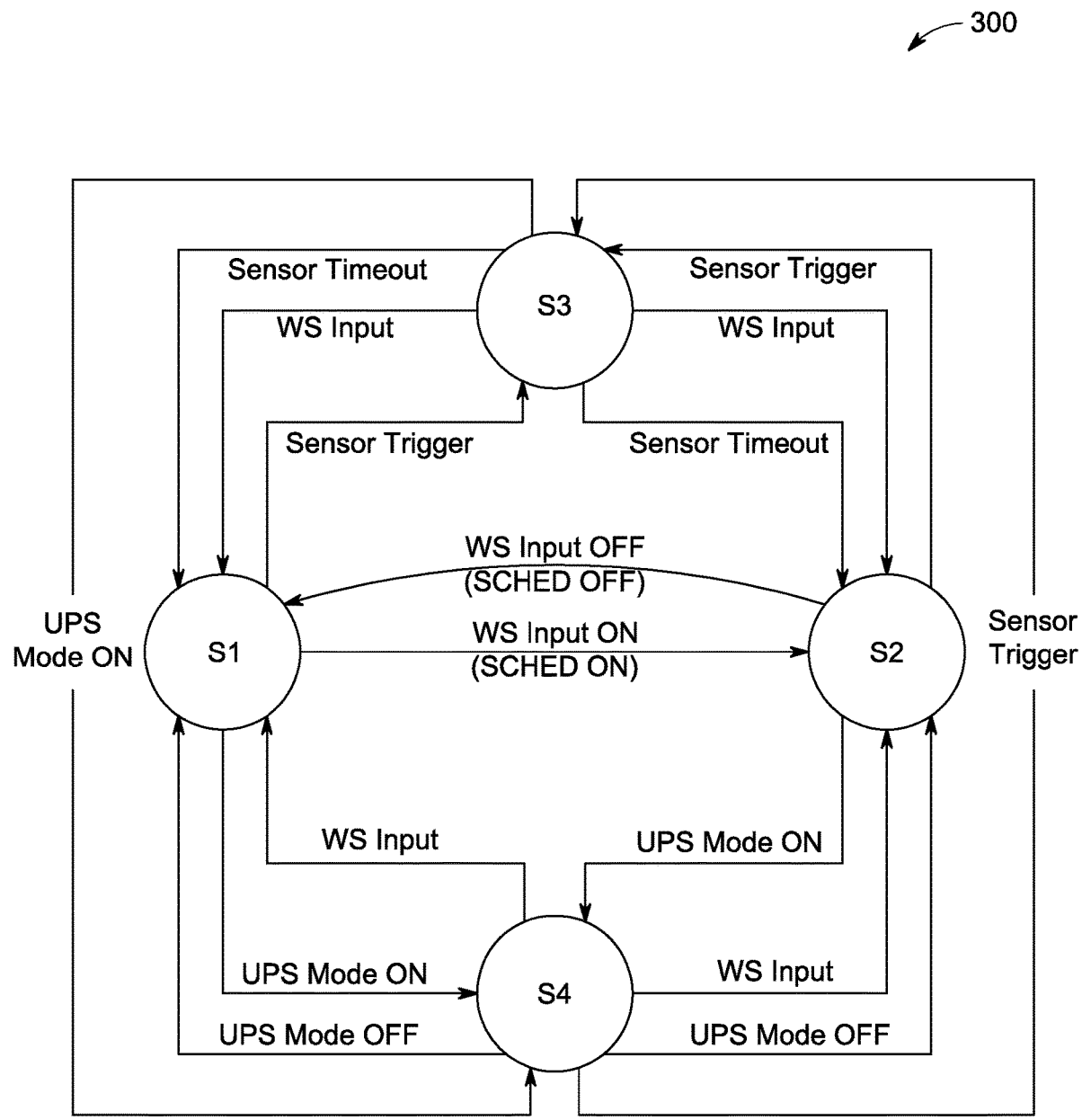
FIG. 3 is graphical state diagram in accordance with another disclosed implementation.

In this example, the rules are as follows:
the lighting device saves PM commands and TM commands separately;
the last PM command is used when a TM state expires;
a PM command clears a TM state;
a TM command replaces the previously saved TM command; and
a PM command replaces the previously saved PM state,
Each state of FIG. 2 is described below.
PM1: PM Deactivated (Light OFF)
PM2: PM Activated (Light ON)
TM1: TM Deactivate State (Light OFF temp)
TM2: TM Activate State (Light ON temp)
FIG. 3 illustrates another example of a state machine 300. The rules for the state machine 300 are as follows:
after power on/reboot of control computing platform 102, all lighting devices return to a state in accordance with the latest PM which can be saved in flash memory of electronic storage 130 or in memory on a local wall switch 122 in accordance with a preset wall switch hierarchy;
after cloud connectivity is restored, the local network switch platform 120 and cloud control computing platform 102 will compare the last PM time stamp and the state of each lighting device 126 is set in accordance with the last PM control command for the lighting device;
when cloud connectivity is lost, the app on client platform 104 that it has lost connectivity, control commands entered through the user interface of client platform 104 will be confirmed and will execute when connectivity is restored
when power is restored, all PoE ports of network switch platform 120 that were in the ON state will be set to the ON state.
Each state of FIG. 3 is described below.
State 1 (Lighting Device in OFF State):
UPS mode is OFF, i.e. utility power is enabled;
all motion sensor ON commands have timed out;
the schedule designates the lighting device as OFF and there has been no subsequent ON command.
State 2 (Lighting Device in ON State):
UPS mode is OFF, i.e. utility power is enabled;
all motion sensors have timed out; and
the schedule designates the lighting device as ON and there has been no subsequent ON command.
State 3 (Lighting Device in ON State at Low Intensity):
a sensor has triggered the light to the ON state;
the triggering sensor has not timed out;
there has been no subsequent off command from the schedule or a wall switch; and
UPS mode is ON, i.e. on batter power.
State 4 (Lighting Device in ON State at Low Intensity):
all sensors have timed out;
UPS mode is on, i.e. battery power; and
there has been no subsequent off command from the schedule or a wall switch.

In some implementations, the system may include one or more computing devices which may be configured to communicate with according to a client/server architecture, peer-to-peer architectures and/or other architectures. All computing devices may be configured by machine-readable instructions which may define one or more instruction modules. The computing devices may include communication lines, or ports to enable the exchange of information with a network and/or other computing platforms. The computing devices may include a plurality of hardware, software, and/or firmware components operating together to provide the functionality attributed herein to the computing devices.

Electronic storage 130 may include non-transitory storage media that electronically stores information. The electronic storage media may include one or both of system storage that is provided integrally (i.e., substantially non-removable) with computing devices and/or removable storage that is removably connectable to computing devices via, for example, a port (e.g., a USB port, a firewire port, etc.) or a drive (e.g., a disk drive, etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 130 may include one or more virtual storage resources (e.g., cloud storage, a virtual private network, and/or other virtual storage resources). The electronic storage 130 may store software algorithms, databases, information determined by processors, information received from computing devices and/or other information that enables the computing devices to function as described herein.

Processors may be configured to provide information processing capabilities in computing devices and may include one or more of a digital processor, an analog processor, a digital circuit designed to process information, an analog circuit designed to process information, a state machine, and/or other mechanisms for electronically processing information. As used herein, the term "module" may refer to any component or set of components that perform the functionality attributed to the module. This may include one or more physical processors during execution of processor readable instructions, the processor readable instructions, circuitry, hardware, storage media, or any other components.

Additional alternative structural and functional designs may be implemented for enforcing compliance policies on decentralized financial transactions. Thus, while implementations and examples have been illustrated and described, it is to be understood that the invention is not limited to the precise construction and components disclosed herein. Various modifications, changes and variations may be made in the arrangement, operation and details of the method and apparatus disclosed herein without departing from the spirit and scope of the invention defined in the appended claims.

What is claimed is:

1. A control system for controlling a networked system of multiple individually addressable devices, the system comprising:
    a plurality of individually addressable devices each having a logical address based on a network addressing scheme, each addressable device being connected to a computer network through a cable that transmits electric power for powering one or more elements of the addressable device and control commands for addressing and controlling the addressable device, each addressable device including a controller for receiving the control commands and controlling a state of the one or more elements in accordance with the control commands;
    at least one Permanent Master control device (PM) configured to selectively send control commands to the addressable devices based on the network addressing scheme, whereby one or more of the addressable devices will assume a state specified by the command until another command is generated to change the state;
    at least one Temporary Master control device (TM) configured to selectively send control commands to the addressable devices based on the network addressing scheme, whereby one or more of the addressable devices will assume a state specified by the command until occurrence of a condition associated with a control signal originated by the TM;
    a grouping database storing group data including addresses of the addressable devices in correspondence with at least one group;
    a command database storing control records of the control commands including an address of the TM or PM transmitting the control command and a time stamp for corresponding to each command;
    a control hierarchy database storing hierarchical control command processing rules; and
    a status controller for processing the control commands causing the addressable devices to assume predefined states based on the control command processing rules, the group data and the control records.

2. The system of claim 1, wherein the control signal processing rules include at least one of the following:
    a control signal of having the latest time stamp in the control records is the effective control signal for a group of addressable devices specified by the control signal;
    control signals from TMs are the effective control signal for a group of addressable devices specified by the control signal until the condition associated with the control signal occurs; and
    after a power loss event or a communication loss event, all addressable devices return to the states corresponding to the latest control signal from a PM.

3. The system of claim 1, further comprising a state database storing states of the addressable devices, PMs, and TMs, and wherein the control command processing rules are dependent on the states.

4. The system of claim 3, further wherein the control command processing rules are dependent on the state of an external device.

5. Then system of claim 4, wherein the external device is an Uninterruptible Power Supply (UPS).

6. The system of claim 1, wherein the condition is an expiration of time.

7. The system of claim 1, wherein the status controller is couple to the elements through a cloud network.

8. The system of claim 1, wherein the status controller is coupled to the elements through a local area network (LAN).

9. The system of claim 1, wherein the addressable devices are at least one of an irrigation device, a lighting controller, and/or a window shade controller.

10. A method for controlling the status of devices in a networked system of multiple individually addressable devices, the system including a plurality of individually addressable devices each having a logical address based on a network addressing scheme, each addressable device being connected to a computer network through a cable that transmits electric power for powering one or more elements of the addressable device and control commands for addressing and controlling the addressable device, each addressable device including a controller for receiving the control commands and controlling a state of the one or more elements in accordance with the control command, a grouping database storing group data including addresses of the addressable devices in correspondence with at least one group, a command database storing control records of the control commands including a control command type and a time stamp for corresponding to each command, a control hierarchy database storing hierarchical control command processing rules, and a status controller for processing the control commands causing the addressable devices to assume predefined states based on the control command processing rules, the group data and the control records, the method comprising:
    transmitting at least one Permanent Master control command (PM) to at least one of the addressable devices based on the network addressing scheme to thereby cause the at least one addressable device to assume a state specified by the PM until another command is generated to change the state;
    transmitting at least one Temporary Master control command (TM) to at least one of the addressable devices based on the network addressing scheme, thereby cause the at least one addressable device to assume a state specified by the TM until occurrence of a condition associated with the TM; and causing, in response to occurrence of the condition, the at least one addressable device to revert to the state specified by the latest in time PM sent to the at least one device.

11. The method of claim 10, wherein the control signal processing rules include at least one of the following:
   a control signal of having the latest time stamp in the control records is the effective control signal for a group of addressable devices specified by the control signal;
   control signals from TMs are the effective control signal for a group of addressable devices specified by the control signal until the condition associated with the control signal occurs; and
   after a power loss event or a communication loss event, all addressable devices return to the states corresponding to the latest control signal from a PM.

12. The method of claim 10, wherein the system include a state database storing states of the addressable devices, PMs, and TMs, and wherein the control command processing rules are dependent on the states.

13. The method of claim 12, further wherein the control command processing rules are dependent on the state of an external device.

14. Then method of claim 13, wherein the external device is an Uninterruptible Power Supply (UPS).

15. The method of claim 10, wherein the condition is an expiration of time.

16. The method of claim 10, wherein the addressable devices are at least one of an irrigation device, a lighting controller, and/or a window shade controller.

* * * * *